Sept. 21, 1926. Re. 16,429

A. S. SPEER

METHOD OF MAKING SHINGLE STRIPS

Original Filed Nov. 12. 1919

Inventor.
Alexander S. Speer.

Emery, Booth, Janney & Varney. Attys.

Reissued Sept. 21, 1926. Re. 16,429

UNITED STATES PATENT OFFICE.

ALEXANDER S. SPEER, OF BUFFALO, NEW YORK, ASSIGNOR, BY MESNE ASSIGNMENTS, TO CENTRAL TRUST COMPANY, OF ILLINOIS, A CORPORATION OF ILLINOIS, AND AKSEL K. BODHOLDT, OF EVANSTON, ILLINOIS, TRUSTEES.

METHOD OF MAKING SHINGLE STRIPS.

Original application filed November 12, 1919, Serial No. 337,577. Patent No. 1,412,295, dated April 11, 1922. Divided and application filed July 14, 1920, Serial No. 396,127. Renewed October 9, 1922, Serial No. 593,460. Application for reissue filed May 14, 1925. Serial No. 30,377.

The invention relates to prepared roofing and particularly to that which is formed in strips having notches extending transversely into the strip at intervals along one edge of the same to simulate the appearance of separate shingles when the strips are laid upon the roof in overlapping relation. Among other objects the invention is intended to provide a new form of shingle strip which affords more complete protection for the roof upon which it is laid and an improved method of making the same involving an economical use of the sheet material from which the shingle strips are produced.

In the accompanying drawings:—

The improved shingle strip 10 is preferably of sufficient length to comprise a plurality of connected shingle tabs 11, shown as four in number, with intervening slots or gutters 12. These shingle tabs constitute the portion of the strip which is exposed to the weather, when in use. A desirable ornamental appearance and other advantages are obtained without in anywise detracting from the utility of the strip, if each of the shingle tabs 11 is formed with chamfered corners 13, thus providing widened or flaring spaces between the ends of adjacent tabs. The line of chamfering of the corners 13 may extend advantageously at an angle of 45° to the front edge of the strip and reach to half the length of the intervening slots or gutters 12.

Figure 4:
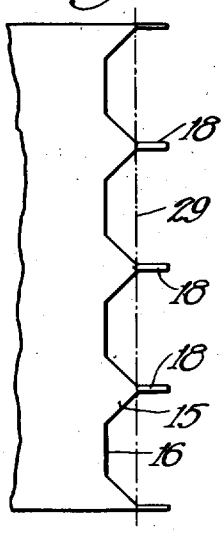
Fig. 4 is a plan view showing the end of the web or sheet of material after it has been severed to remove the preceding unit. The position of the next line of severance (to remove the material forming the slots between the tabs) being indicated by the dot and dash line.

Under these circumstances the remainder of the strip 10 may comprise, without waste of material, a continuous body portion 14 having the full width usually provided for the portion of a shingle strip which is to be covered by succeeding layers of similar strips, when in use, and a series of extensions 15 arranged along the back or covered edge 16 of the strip in line with the gutters or slots 12. It follows that if each of the extensions 15 conforms in shape with the material removed from between the outer end portions of two adjacent shingle tabs 11, a plurality of the shingle strips 10 may be completely formed from a length of web 17 equal only to the combined widths of the strips from the free edges of the shingle tabs 11 to the rear edge 16 of the main body portion 14 of the strip. When this construction is used the only part of the original web 17 which is discarded comprises the short tongues 18 removed from the inner end portions of the slots 12 (for example as shown in Fig. 4) while the full width of the shingle strips 10 from the free edges of the shingle tabs 11 to the rear edge 16 of the main body portion 14 of the strip may be only two and one-half times the length of the shingle tabs and still permit of the strips being laid upon the roof with the full length of the shingle tabs exposed to the weather and with two full layers of roofing material covering all parts of the roof to the inner ends of the gutters or slots 12. The strips may be fastened desirably to the roof as usual with nails 19 introduced just above the inner ends of the slots 12. The nails are thus covered by the shingle tabs 11 of the next overlying strip and each one of the extensions 15 is firmly held to the roof by reason of its position, in this instance, under two overlying strips which are in turn fastened to the roof at a point immediately beyond the end of the extension.

The strips 11 and discarded tongues 18 may conveniently be cut from the web 17 by a machine embodying certain of the principles of Patent No. 1,249,544, granted to me, December 11, 1917. In using a machine of this character, the web 17 is continuously advanced upon a cutting table 22, preferably by feed rolls conveniently represented at 20 and 21. The cutting table 22 cooperates with a rotary knife 25 and these two parts are provided with complementary fingers 23 and slots 24 having respectively widened bases 26 and throats 27 conforming in shape with the slots 12 and chamfered tab corners 13 of the shingle strips.

In the operation of the machine, the rotation of the knife 25 is of course so timed with reference to the rate of feeding of the web 17 that a shingle strip 10 of full width is struck off from the end of the web at each downward movement of the knife over the edge of the table. A second knife 28, rotating upon the same axis with the knife 25 and preferably rigidly connected thereto, serves to strike off the tongues 18 which would otherwise project from the extensions 15 at the back edge of the shingle strip. As shown, the knife 28 is of such length and is disposed at such an angle with respect to the knife 25 that it cooperates with the fingers 23 of table 22 to sheer the tongues 18 from web 17 after each operation of the knife 25, as indicated by the dot and dash line 29 (Fig. 4).

Figure 1:
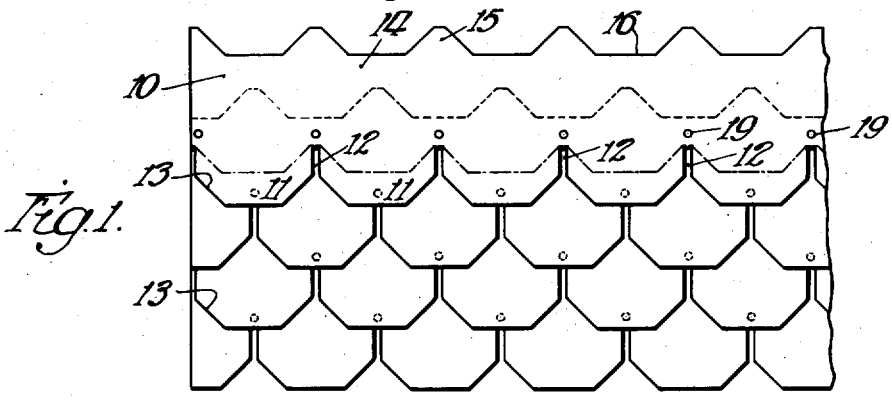
Fig. 1 is a plan view showing a plurality of overlapping courses of the improved shingle strips as they may be laid upon a roof, the relative position of the upper or covered edge of the first underlying course being indicated in dotted lines and that of the second underlying course being indicated in dot and dash lines.
Figure 2:
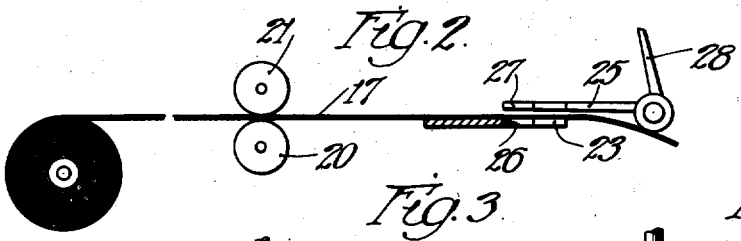
Fig. 2 is a side elevation partly in section representing somewhat diagrammatically suitable apparatus for forming the improved strips from an elongated sheet or web or material.
Figure 3:
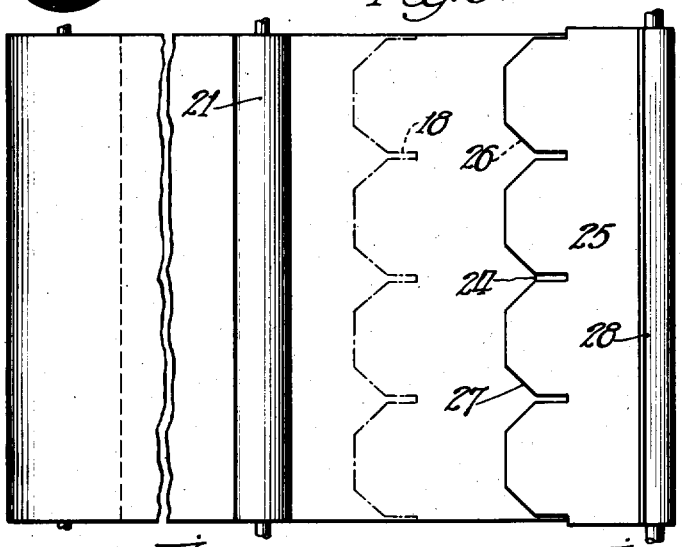
Fig. 3 is a plan view of the apparatus of Fig. 2, the outline in dot and dash lines indicating a line of severance of the material upon a subsequent operation of the mechanism and indicating also the complementary relationship of the front and rear edges of the shingle units.
Figure 5:
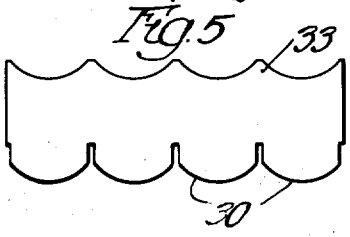
Figs. 5 and 6 are plan views of different forms of shingle strips or units having different shingle tab contours and correspondingly different contours for the projecting tabs at the rear edges of the units.
Figure 6:
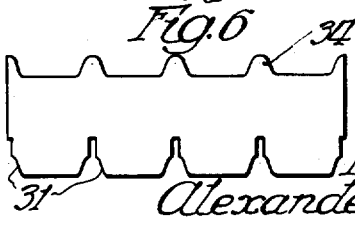

It will be understood that the shingle tabs 11 may have rounded ends, as 30 (Fig. 5) or curved corners as 31 (Fig. 6). Any of these forms may be produced upon the machine illustrated in Fig. 2 if the cooperating cutting edges of the knife 25 and table 22 are made to conform thereto and the material removed from one edge of the strip serves to provide the extensions 33 or 34 at the rear edge of the next succeeding strip without increasing the length of web, as 17, required for the production of the strip.

This application is a division of my copending application, Ser. No. 337,577, filed November 12, 1919, now Patent No. 1,412,295, dated April 11, 1922.

I claim:—

1. The method of producing like multiple shingle strips each having a slotted edge which consists in repeatedly cutting a sheet of the strip material upon broken lines conforming to the outline of the slotted edges of the strips, the said cuts being parallel to each other and separated by distances equal to the width of the strips and between each two consecutive broken line cuts cutting off the fingers left projecting from the sheet by the last preceding broken line cut.

2. The method of producing like shingle units presenting collectively the appearance of spaced shingles which consists in progressively cutting a web of the strip material at intervals alternately on broken and straight lines transversely of the length of the web, the broken line cuts conforming to the outline presented by said spaced shingles and being spaced in accordance with the depth of the units and each of the straight lines cuts intersecting the fingers left projecting from the end of the web by the last preceding broken line cut.

3. The method of producing like shingle strips each having a slotted edge which consists in progressively cutting a web of the strip material at intervals along the same alternately on broken and straight lines, the broken line cuts conforming to the outline of the slotted edges of the strips and being spaced in accordance with the width of the strips and each of the straight line cuts intersecting the projecting fingers formed by a broken line cut intermediate the ends of the said fingers.

4. The method of producing like multiple shingle strips each having a slotted edge which consists in repeatedly cutting a sheet of the strip material upon broken lines conforming to the outline of the slotted edges of the strips, the said cuts being parallel to each other and separated by distances equal to the width of the strips, and cutting the sheet of material to remove tongue-like fragments to form the slots at the edges of the strips.

5. The method of producing like multiple shingle strips having at one side edge recesses and at the other extensions of less length than the depth of the recesses, with a minimum of waste of material, which consists in progressively cutting a web of material on a line conforming to the contour of the edge having the recesses and with the extensions on the web, and cutting the excess material simultaneously from all of the extensions.

6. The method of cutting like multiple shingle strips each having a slotted edge from a length of a web of material which consists in cutting the web at intervals along the same on broken lines transversely to the length of the web and conforming to the outline of the said slotted edges of the strips and removing a part only of each extension left projecting from the web by each of the said broken line cuts.

7. The method of producing like shingle units collectively presenting the appearance of spaced shingles, which comprises repeatedly cutting a sheet of roofing material at intervals along broken lines conforming to the outline presented by said units collectively and, cutting from the sheet material to form the spaces between the shingles.

8. The method of producing like shingle strips having spaced shingle tabs, the ends of which are narrower than the width of the body of the tabs, which comprises repeatedly cutting a sheet of the strip material at intervals along broken lines conforming to the outline of the shingle tabs, and, following each broken line cut, cutting from the sheet the material forming the spaces between the tabs but leaving the material which produces the narrowed ends of the tabs.

9. The method of producing like shingle strips having a plurality of shingle tabs with narrowed ends, the body of the tabs being separated by slots, each of uniform width but widened at the ends to form the narrowed ends on the shingle tabs, which comprises cutting a web of the strip material transversely of its length, at intervals corresponding to the depth of the strip, along broken lines conforming to the outline presented by the narrow ends of the shingle tabs, and removing from the sheet the material to form the slots between adjacent shingle tabs.

10. The method of producing shingle strips having a plurality of spaced shingle tabs projecting therefrom, which comprises advancing a sheet of the strip material; cutting the same transversely at intervals, corresponding to the depth of the strip, along a broken line conforming to the contour of the edge of the strip having the projecting shingle tabs, and severing from the sheet the material which is left after the broken line cut to form the spaces between the shingle tabs.

11. The method of producing from the prepared roofing material shingle units having cut-away portions and presenting collectively the appearance of spaced shingles, which comprises severing the units from the sheet of material and leaving the portions of material constituting the waste from the cut-away parts of the unit attached to the sheet of material, removing the severed units from the sheet and then severing the waste portions from the sheet.

12. The method of producing from prepared roofing material shingle units having cut-away portions involving the production of waste, which comprises severing said units from said sheet successively along lines conforming to the contour of the edge of the unit having the cut-away portions but leaving the waste material forming the cut-away portions attached to the sheet, said severing being effected by a rotary chopping motion to remove the severed units from the place of severing, and, between each severing of the material, cutting the waste pieces forming the cut-away portions from the sheet.

13. The method of producing from prepared roofing material shingle units, the contour of which involves the production of waste, which comprises cutting a sheet of roofing material at intervals along lines to give the unit the required contour, but leaving the waste parts attached to the sheet, and, between each cut, severing the waste material from the sheet.

14. The method of producing from prepared roofing material shingle units, the contour of which involves the production of waste, which comprises cutting a sheet of roofing material at intervals along lines to give the unit the required contour, but leaving the waste parts attached to the sheet, removing the cut unit from the sheet and separately severing the waste material from the sheet.

15. A method of making shingle units of the character described, which is characterized by repeatedly severing a sheet of material along similar lines, similarly located relative to each other, to form spaced projections on the rear edges of said units and corresponding indentations in the front edges of said units; and cutting away material adjacent said indentations to form spaced shingle tabs on said units.

16. A method of making shingle units having shingle tabs separated by slots which widen or flare out adjacent the ends of the tabs which is characterized by repeatedly severing a sheet of material along lines corresponding with the contour of the front edges of said units, said lines being similarly located so that similar parts of successive lines are in alinement; and leaving attached to next adjacent units the material severed to form the widened spaces between the shingle tabs; and cutting away the material which forms the slots between the tabs, whereby the rear edge of each unit is provided with projections opposite the slots on the front edge to form protecting tabs when said units are laid in overlapping courses.

17. A method of making shingle units of the character described, which is characterized by repeatedly severing a sheet of material transversely along similar lines, similarly located relative to each other, to form spaced projections on the rear edges of said units, and corresponding indentations in the front edges of said units, and cutting away material adjacent said indentations to form spaced shingle tabs on said units, thereby eliminating waste except that constituting the material cut away to provide the spaces between the tabs.

ALEXANDER S. SPEER.